E. GRUENFELDT.
MOTOR VEHICLE.
APPLICATION FILED FEB. 21, 1914.
1,203,727.
Patented Nov. 7, 1916.
3 SHEETS—SHEET 1.
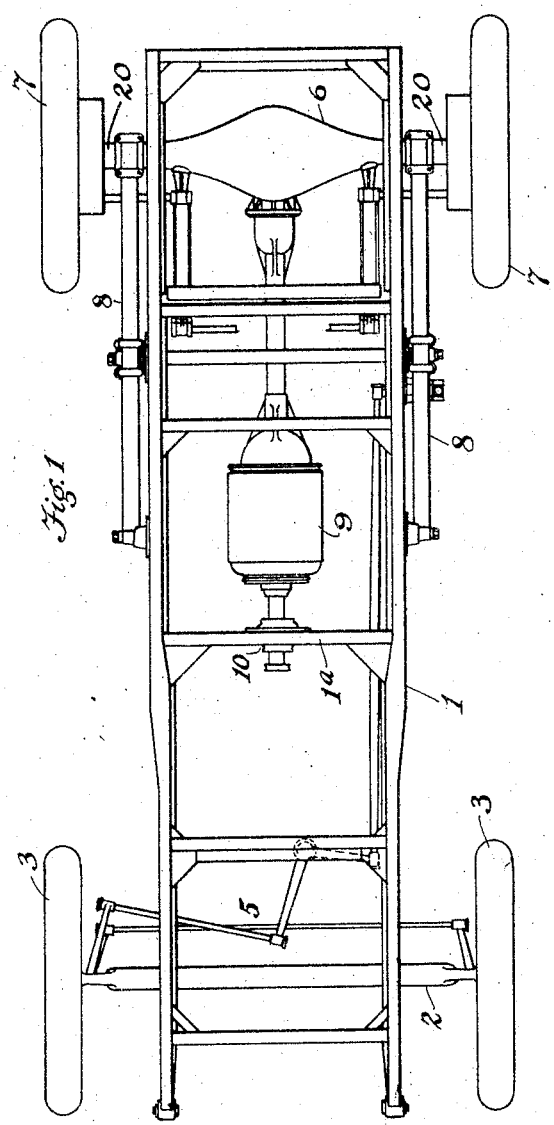
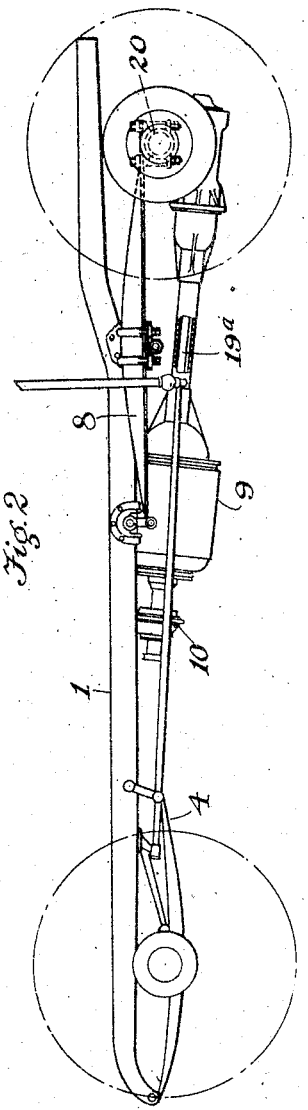
Witnesses:
F. C. Valentine
Geo. B. Pitts
Inventor:
Emil Gruenfeldt
by Edward R. Alexander
Attorney.

E. GRUENFELDT.
MOTOR VEHICLE.
APPLICATION FILED FEB. 21, 1914.
1,203,727.
Patented Nov. 7, 1916.
3 SHEETS—SHEET 2.
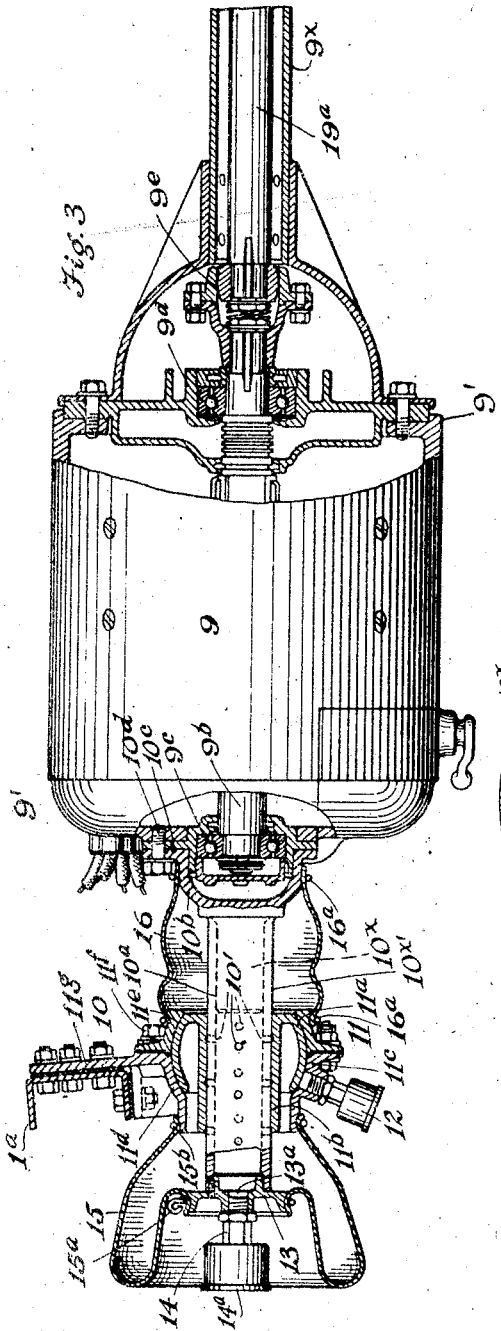
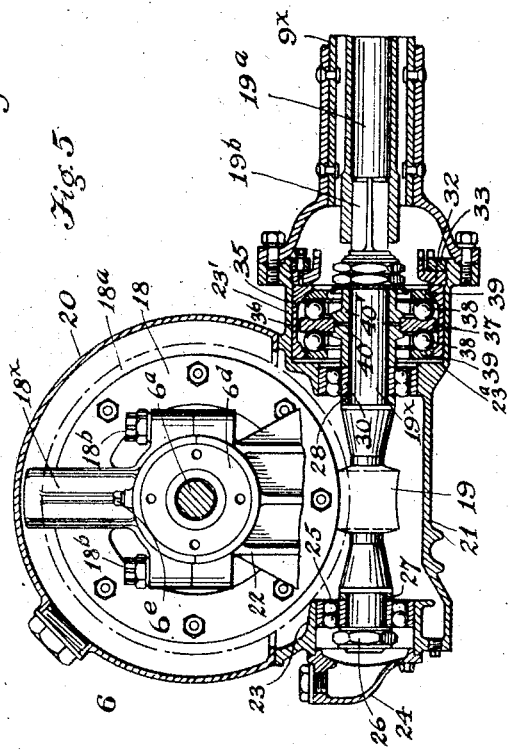
Witnesses:
Inventor:
Emil Gruenfeldt
by
Attorney.

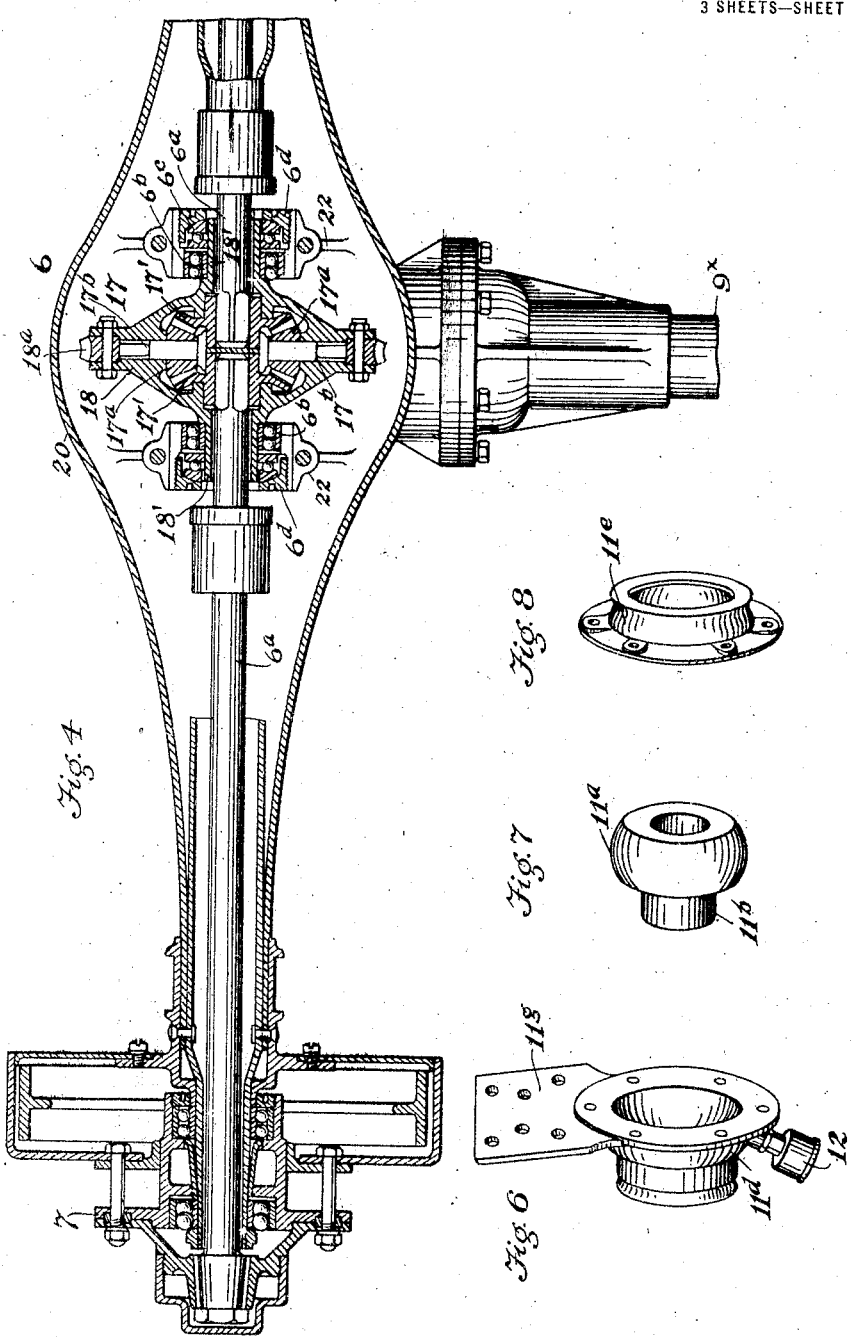

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

MOTOR-VEHICLE.

1,203,727.   Specification of Letters Patent.   Patented Nov. 7, 1916.

Application filed February 21, 1914. Serial No. 820,114.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Motor-Vehicles, of which the following is a specification.

This invention relates to improvements in motor vehicles, more particularly motor vehicles in which an electric motor is employed for transmitting power for propelling the vehicle.

One of the objects of my invention is to support an electric motor from the frame of a motor vehicle in such manner as to permit the motor, during the normal operation of the vehicle, to readily and freely accommodate itself to any position into which the movements of the rear drive axle and the frame relatively to each other may tend to move the motor while preserving the proper coöperative relationship of the parts.

Other objects of my invention will be readily appreciated by one skilled in this art from the description of one form of the motor vehicle embodying it, which for the purpose of illustration I have in the accompanying drawings, shown and hereinafter described.

Figure 1 is a top plan view of a motor vehicle chassis, the body therefor and other parts of the vehicle not being shown. Fig. 2 is a side elevation of the parts shown in Fig. 1. Fig. 3 is a fragmentary view of the motor, the front end support therefor and a portion of the propeller shaft, parts being broken away. Fig. 4 is a fragmentary sectional view of the rear drive axle mechanism. Fig. 5 is a fragmentary transverse sectional view showing the mounting for the rear end of the propeller shaft and associated parts. Figs. 6, 7 and 8 are detail views.

In the drawings, 1 illustrates a suitable frame. It may be formed largely of channel iron or steel in the well known manner, or otherwise constructed for its purpose as desired. At its front end this frame is preferably supported by an axle 2, steering wheels 3, and springs 4, all of which parts may be of any desired construction. Likewise the steering mechanism illustrated in the drawings and indicated by the numeral 5 may be of any suitable and preferred form, and accordingly it is not necessary to describe these parts in detail. At its rear end the frame 1 is preferably supported by rear drive axle mechanism 6, driving wheels 7, and springs 8, which are preferably of the cantaliver type. These parts in themselves also form no part of my invention and may accordingly be of any desired character.

In the form of construction shown, the rear end of each spring 8 has interposed between it and the housing 20 a collar which rotatably fits the housing and permits angular movement of the spring thereon. The front end of the spring 8 is preferably shackled to the frame 1. Intermediate its ends the spring 8 is connected to the frame in any well known manner, as by the pivot 8'.

9 indicates an electric motor. The armature shaft of the motor is indicated at $9^b$. At its front and rear ends it is suitably mounted in anti-friction bearings $9^c$, $9^d$, respectively. The rear end of the armature shaft $9^b$ may be connected to the front end of the propeller shaft $19^a$ in any suitable manner. For this purpose, I have illustrated a coupling device $9^e$ which will permit slight universal movement of the shafts $9^b$ and $19^a$ while causing them nevertheless to rotate together. This sort of a coupling is used largely for the purpose of facilitating manufacture and assembly of the co-acting and connected parts. The rear end of the propeller shaft $19^a$ is preferably connected to the front end of the worm shaft $19^x$ by a slidable or telescopic joint $19^b$.

$9^x$ indicates a tube inclosing the propeller shaft $19^a$ and rigidly connected to the motor casing $9'$ at its front end and at its rear end to the housing 20 for the rear axle mechanism 6.

10 indicates supporting means for the motor arranged between its front end and a cross member $1^a$ on the frame 1. The supporting means 10 permit the motor to swing in substantially all directions, to oscillate about the axis of its armature shaft and to move to and fro longitudinally of the frame 1, all of which will be readily understood from the following description. Of these supporting means, $10^a$ indicates a projecting member rigidly secured at its rear end to the motor casing $9'$. The member $10^a$ is preferably arranged in alinement with the axis of the armature shaft of the motor 9. The member 10ª preferably comprises a stud 10ˣ and a sleeve or hollow section 10ˣ' one end of which fits over and is rigidly secured to the stud 10ˣ. The stud 10ˣ is provided with an enlarged cup-shaped rear end as shown at 10ᵇ to fit over the adjacent bearing for the armature shaft. The end 10ᵇ of the member 10ª is preferably provided with a flange 10ᶜ through which suitable bolts 10ᵈ extend to secure the member 10ª to the motor casing 9'.

11 indicates a universal joint the ball member 11ª of which is provided with an elongated bearing 11ᵇ to slidably receive the member 10ª. The socket member 11ᶜ, of the universal joint 11, comprises two parts 11ᵈ, 11ᵉ, which are arranged to be clamped together by suitable bolts 11ᶠ. The part 11ᵈ of the socket member 11ᶜ is provided with an integral bracket 11ᵍ which is rigidly secured to the cross member 1ª in any well known manner.

12 indicates an oil cup, the feed tube of which is screw threaded into an opening formed in one part of the socket member 11ᶜ. The oil cup 12 is arranged to supply a suitable lubricant to the universal joint in any well known manner.

13 indicates a removable cap device screw threaded to the front end of the member 10ª. The cap device 13 is formed with an opening 13ª in which the feed tube 14 of an oil cup 14ª is supported and conveys a lubricant to the interior of the member 10ª, from which it passes through openings 10' formed in the wall thereof to lubricate the bearing 11ᵇ.

15, 16, indicate suitable covers, arranged on and extending from opposite sides of the supporting means 10. The front end of the cover 15 is detachably secured to the cap device 13 by a spring clamp 15ª, and its opposite end is detachably connected to the socket member 11ᶜ by a resilient clamp 15ᵇ. The opposite ends of the cover 16 are preferably secured to the socket member 11ᶜ and cup member 10ᵇ by resilient clamps 16ª, which permit it to be removed at will.

By mounting the motor as I have done it is possible to get a low hung chassis, and particularly is this true by arranging all of the speed reduction gearing on or at the rear axle, as illustrated.

Of the rear axle mechanism, 6ª, 6ª, indicate, respectively, the shaft sections of the driving axle with the outer end of each of which a vehicle driving wheel 7 has driving connection. The inner contiguous ends of the shaft sections are connected by compensating gearing 17 of any approved construction. That which is illustrated in the drawings comprises the bevel wheels 17', 17', each having a driving connection with the inner end of one of the shaft sections, and bevel pinions 17ª between the bevel wheels, each mounted upon a shaft 17ᵇ which is supported in the differential housing 18. The latter has connected to it a worm gear 18ª with which meshes the worm 19 upon the driving shaft 19'.

The worm 19 is illustrated as formed integral with the drive shaft 19'. The bevel wheels 17' are shown to be connected with their respective shaft sections through the instrumentality of square passage ways through the gears which receive the squared ends of the shaft sections, so as to permit relative longitudinal movement of the parts while insuring that those which are connected together will rotate together.

The worm and worm gear and differential gearing are preferably so supported that they may be easily removed as a unit from the housing 20. To this end the gearing is mounted upon a detachable section or cap piece 21 of the axle casing, so that the gear mount including the support 21 may be separated from the rest of the casing, when the axle sections 6ª, 6ª, are withdrawn from the differential gears a sufficient distance. The gear support and bearing piece 21 is preferably an integral casting suitably shaped, and is secured in position by bolts. It is formed with pillow blocks or rests 22 in which are mounted the supporting bearings 6ᵇ and thrust bearings 6ᶜ, which directly support the sleeve portions 18' of the differential housing 18, and indirectly the inner ends of the driven shaft sections. The bearings just referred to may be of any suitable type of anti-friction bearing, for illustration ball bearings of any well known construction are shown. These ball bearings are held in place by a cap piece or bearing yoke 18ˣ which at its opposite ends is secured to the pillow block portions 22 of the removable portion 21 of the gearing housing or case by means of bolts 18ᵇ.

The sleeves 18' of the differential housing are preferably stepped, the load bearings 6ᵇ occupying the inner and higher—that is—more remote from the axis of rotation—steps while the thrust bearings 6ᶜ occupy the outer and lower steps. An adjusting ring 6ᵈ for setting or adjusting each thrust bearing 6ᶜ, as well as permitting and effecting lateral adjustment of the differential housing 18 and worm gear 18ª is employed. Each adjusting ring 6ᵈ has a screw threaded engagement with the adjacent pillow block or rest 22 and end of the bearing yoke 18, which together constitute a supporting ring for the bearings and adjusting rings arranged therebetween. A lock of any preferable kind, as indicated at 6ᵉ by a bolt extending through the support 18, is employed for holding the adjacent adjusting ring 6ᵈ in place.

The parts just described are so shaped, disposed and correlated that the housing 18 may be adjusted laterally independently of the shaft sections 6ª, 6ª, for the purpose of insuring proper mesh relationship between the worm gear 18ª and worm 19.

The removable cap piece 21 of the axle housing is provided with a pair of oppositely extending hubs 23, 23′ in alinement with each other and disposed to receive the drive shaft 19ˣ. The outer end of this shaft is shown to lie within the hub 23 which is inclosed by a cap 24.

25 is an anti-friction bearing disposed within the hub 23 so as to be longitudinally movable to and fro therein and to support the free or outer end of the drive shaft 19ˣ, which latter is screw threaded to receive a nut 26.

30 indicates an anti-friction bearing for the drive shaft which is arranged in the hub 23′, it like the bearing 25 is longitudinally adjustable within its support, and may be of any suitable construction of load taking bearing. Washers or sleeves 27, 28 may be interposed between the shoulders of the drive shaft 19ˣ and the adjacent load bearings, 25, 30, respectively.

35 indicates as an entirety a thrust bearing. It comprises the cylindrical member 36, spacing ring 37, balls 38 and rings 39, 39. The rings 39, 39 snugly fit the internal spherical surfaces of the cylindrical section 36 so that the parts of the bearings contained within the cylinder 36 may have universal movement relative thereto.

40, 40′ are sleeves or collars for locating the position of the center ring 37 of the thrust bearing.

The thrust bearing as an entirety is positioned within the hub 23′ between the shoulder 23ª thereof and a screw-threaded ring or adjustment collar 32. The ring 32 may be locked in position in any suitable manner. For the purpose I have illustrated a locking ring 33.

The drive shaft unit of the rear axle mechanism, including shaft 19ˣ thereof, may be assembled as a unit and introduced as such into the housing section therefor provided in the removable cap piece 21; in fact all the parts carried by this cap piece may be assembled as a gear mount unit, which unit is then placed in position and secured to the other portion of the housing 20 in any suitable manner.

I make no claim to the invention of any novel and patentable features of the rear axle mechanism hereinbefore described.

The co-action and coöperation of the various parts will be readily understood, it being noted that the driving force for the vehicle as an entirety is transmitted from the rear wheels through the rear springs 8 to the frame 1, and that any tendency of the rear axle housing, during operation of the vehicle to turn in either direction about its longitudinal axis is absolutely prevented by the nature of the mechanical connections between it and the frame including the motor casing and the tube 9ˣ.

In my form of construction the rear axle housing or casing 20, tube 9ˣ for the propeller shaft, motor casing 9′ and ball member 11ª always move or swing as a unitary structure, and the universal joint 11 being in alinement with the axis of the armature shaft, permits these parts to oscillate about the axis of the shaft; whereas, the slidable connection between the ball member 11ª and slide member 10ª permits movement of the motor casing 9′ and the parts connected therewith longitudinally of the frame. It will be noted therefore that the supporting means for the front end of the motor casing 9′ permit the motor, member 10ª, and connections between the motor and rear axle and the rear axle always to move as a unit relative to the frame 1 and under the guidance of the support between the frame and front end of the motor while maintaining the proper relative operating relationship of all of the parts.

By mounting the motor as herein shown and providing the speed reduction gearing entirely at the rear axle, an unusually quiet operating electric motor vehicle is obtained, since the so-to-speak sound-board effect noticeable in electric motor vehicles where the motor and reducing gear are arranged in close proximity to the body of the vehicle, is avoided.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

I claim:

1. In an electric motor vehicle, the combination with a frame and wheeled supports at the front and rear ends thereof, including rear axle driving mechanism having a housing, of an electric motor having a casing, a rigid connection between the motor casing and said housing, and means arranged in front of said motor and motor casing and between the motor casing and said frame for movably supporting said motor, the said means comprising a ball and socket joint and a connection between the front end of the motor casing and said joint, slidably supported in the ball of said joint whereby said rear axle, motor and connections therebetween as a unit may swing in all directions relatively to the frame and move to and fro longitudinally of the frame.

2. In an electric motor vehicle, the combination with a frame and wheeled supports at the front and rear ends thereof, including rear axle driving mechanism having a housing, of an electric motor having a casing, a rigid connection between the motor casing and said housing, and means arranged in front of said motor and motor casing and between the motor casing and said frame for movably supporting said motor, the said means comprising a ball and socket joint and a connection between the front end of the motor casing and said joint, slidably supported in the ball of said joint, and the axis of said joint being in line with the axis of the shaft for said motor whereby said rear axle, motor and connections therebetween as a unit may swing in all directions relatively to the frame and move to and fro longitudinally of the frame.

3. In an electric motor vehicle, the combination with a frame and wheeled supports at the front and rear ends thereof, including rear axle driving mechanism having a housing, of an electric motor having a casing, a rigid connection between the motor casing and said housing, a member fixed to and extending from the front end of the motor casing, a universal joint arranged in front of said motor and comprising ball and socket members, the ball member being provided with a diametrically extending bearing to slidably and rotatably receive said member extending from the motor casing, and means for rigidly securing said socket member to said frame whereby said rear axle, motor and connections therebetween as a unit may swing in all directions relatively to the frame and move to and fro longitudinally of the frame.

4. In an electric motor vehicle, the combination with a frame and wheeled supports at the front and rear ends thereof, including rear axle driving mechanism having a housing, of an electric motor having a casing, a rigid connection between the motor casing and said housing, and means arranged in front of said motor and motor casing and between the motor casing and said frame for movably supporting said motor, the said means comprising ball and socket members and a connection extending forward from the front end of the motor casing and slidably mounted in the ball member of said supporting means whereby said rear axle, motor and connections therebetween as a unit may swing in all directions relatively to the frame and move to and fro longitudinally of the frame.

5. In an electric motor vehicle, the combination with a frame and wheeled supports at the front and rear ends thereof, including rear axle driving mechanism having a housing, of an electric motor having a casing, a rigid connection between the motor casing and said housing, a member fixed to and extending from the front end of the motor casing in line with the axis of the shaft for said motor, a universal joint arranged in front of said motor and comprising ball and socket members, the ball member being provided with a diametrically extending bearing to slidably and rotatably receive said member extending from said motor casing, and means for rigidly securing said socket member to said frame whereby said rear axle, motor and connections therebetween as a unit may swing in all directions relatively to the frame and move to and fro longitudinally of the frame.

6. In an electric motor vehicle, the combination with a frame and wheeled supports at the front and rear ends thereof, including rear axle driving mechanism having a housing, of an electric motor having a casing, a rigid connection between the motor casing and said housing, a hollow member fixed to and extending from the front end of the motor casing, a socket member fixed to said frame, a ball member movably fitting within said socket member and provided with a bearing arranged to slidably receive said hollow member, the hollow member being formed with openings in its wall, and means for supplying a lubricant to the interior of said hollow member whereby said rear axle, motor and connections therebetween as a unit may swing in all directions relatively to the frame and move to and fro longitudinally of the frame.

7. In combination, a frame, a rear drive axle including a housing, driven shafts and a differential mechanism incased by said housing, a propeller shaft journaled in said housing and geared to said differential mechanism, torque absorbing means rigidly connected at its rear end to said housing and at its front end having a universal and longitudinally slidable connection with said frame independent of said propeller shaft, and cantaliver springs, each connected at its front end and also intermediate its ends to said frame and having its rear end rotatably mounted on said axle housing, whereby said axle may move longitudinally and vertically relative to said frame.

8. In combination, a frame, a rear drive axle including a housing, driven shafts and a differential mechanism incased by said housing, a propeller shaft journaled in said housing and geared to said differential mechanism, torque absorbing means rigidly connected at its rear end to said housing and at its front end having a universal and longitudinally slidable connection with said frame independent of said propeller shaft, and cantaliver springs, each swingably connected at its front end and also intermediate its ends to said frame and having its rear end rotatably mounted on said axle housing, whereby said axle may move longitudinally and vertically relative to said frame.

9. In combination, a frame, a rear drive axle including a housing, driven shafts and a differential mechanism incased by said housing, a propeller shaft journaled in said housing and geared to said differential mechanism, torque absorbing means rigidly connected at its rear end to said housing and at its front end having a universal and longitudinally slidable connection with said frame independent of said propeller shaft, and cantaliver springs, each swingably connected at its front end to said frame, pivotally connected intermediate of its ends to said frame and having its rear end rotatably mounted on said axle housing, whereby said axle may move longitudinally and vertically relative to said frame.

10. In combination, a frame, a rear drive axle including a housing, driven shafts and a differential mechanism incased by said housing, a propeller shaft journaled in said housing and geared to said differential mechanism, a torque tube surrounding said propeller shaft, rigidly connected at its rear end to said housing and extending forwardly, a universal joint supported from said frame and having longitudinally slidable connection with the front end of said torque tube independent of said propeller shaft, cantaliver springs, each connected intermediate of its ends to said frame, connections between the front ends of said springs and said frame permitting relative movements thereof, and connections between the rear ends of said springs and said axle housing permitting relative movements thereof, whereby said axle may move longitudinally and vertically relative to said frame.

In testimony whereof I affix my signature, in the presence of two witnesses.

EMIL GRUENFELDT.

Witnesses:
F. R. GUYON,
FRED C. DORN.